(12) United States Patent
Matsuno

(10) Patent No.: US 11,763,484 B2
(45) Date of Patent: Sep. 19, 2023

(54) LOCATION ESTIMATION SYSTEM AND LOCATION ESTIMATION METHOD

(71) Applicant: Toyota Jidosha Kabushiki Kaisha, Toyota Aichi-ken (JP)

(72) Inventor: Nobuyuki Matsuno, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 368 days.

(21) Appl. No.: 17/228,930

(22) Filed: Apr. 13, 2021

(65) Prior Publication Data

US 2021/0343038 A1 Nov. 4, 2021

(30) Foreign Application Priority Data

Apr. 30, 2020 (JP) .................................. 2020-080021

(51) Int. Cl.
*G06T 7/73* (2017.01)
*G06F 16/29* (2019.01)

(52) U.S. Cl.
CPC ................ *G06T 7/73* (2017.01); *G06F 16/29* (2019.01); *G06T 2207/30181* (2013.01)

(58) Field of Classification Search
CPC ............ G06T 7/73; G06T 2207/30181; G06T 2200/28; G06T 2207/30244; G06T 7/246; G06F 16/29

USPC .......................................................... 382/103
See application file for complete search history.

(56) References Cited

U.S. PATENT DOCUMENTS

2019/0220997 A1\* 7/2019 Asai .................... G01C 21/3822

FOREIGN PATENT DOCUMENTS

| JP | 2015210677 A | 11/2015 |
|---|---|---|
| JP | 6441586 B2 | 12/2018 |
| JP | 2019132664 A | 6/2019 |

\* cited by examiner

*Primary Examiner* — Stephen P Coleman
(74) *Attorney, Agent, or Firm* — Dinsmore & Shohl LLP

(57) ABSTRACT

An exemplary aspect is a location estimation system, including: a feature value extraction processing unit that performs feature value extraction processing for extracting a feature value from an input image; and a location estimation processing unit that compares the extracted feature value with map information and performs location estimation processing for estimating a self-location based on a result of the comparison. While the location estimation processing unit is performing the location estimation processing corresponding to an input image input at a predetermined timing, the feature value extraction processing unit performs the feature value extraction processing on an input image input at a timing after the predetermined timing.

10 Claims, 9 Drawing Sheets

| TIMING | t1 | t2 | t3 | t4 | t5 | t6 |
|---|---|---|---|---|---|---|
| INPUT IMAGE | P(t1) | P(t2) | P(t3) | P(t4) | P(t5) | P(t6) |
| FEATURE VALUE EXTRACTION PROCESSING | F(t1) | F(t2) | F(t3) | F(t4) | F(t5) | F(t6) |
| LOCATION ESTIMATION PROCESSING | — | L(t1) | L(t2) | L(t3) | L(t4) | L(t5) |
| SELF-LOCATION INFORMATION | — | S(t1) | S(t2) | S(t3) | S(t4) | S(t5) |

Fig. 2

| TIMING | t1 | t2 | t3 | t4 | t5 | t6 |
|---|---|---|---|---|---|---|
| INPUT IMAGE | P(t1) | P(t2) | P(t3) | P(t4) | P(t5) | P(t6) |
| FEATURE VALUE EXTRACTION PROCESSING | F(t1) | — | F(t3) | — | F(t5) | — |
| LOCATION ESTIMATION PROCESSING | — | L(t1) | — | L(t3) | — | L(t5) |
| SELF-LOCATION INFORMATION | — | S(t1) | — | S(t3) | — | S(t5) |

Fig. 3

LOCATION ESTIMATION SYSTEM AND LOCATION ESTIMATION METHOD

CROSS REFERENCE TO RELATED APPLICATIONS

This application is based upon and claims the benefit of priority from Japanese patent application No. 2020-080021, filed on Apr. 30, 2020, the disclosure of which is incorporated herein in its entirety by reference.

BACKGROUND

The present disclosure relates to a location estimation system and a location estimation method.

As a technology for simultaneously estimating a self-location and creating a map, Visual Simultaneous Localization and Mapping (VSLAM) can be used. The VSLAM is a technology for performing feature value extraction processing on each frame of an image acquired by a camera and tracking the extracted feature value over time, thereby simultaneously estimating a location and a posture of itself (the camera) in a three-dimensional space and creating a map.

Japanese Patent No. 6441586 discloses a technology related to an information processing apparatus capable of performing location estimation by real-time processing with limited resources.

SUMMARY

A location estimation system repeats processing for extracting a feature value from an input image and processing for estimating a self-location using the extracted feature value, thereby estimating a self-location which changes over time.

However, each of the processing for extracting a feature value from an input image and the processing for estimating a self-location using the extracted feature value requires a predetermined time for execution. Therefore, the location estimation system has a problem that an update frequency of location information to be acquired becomes low.

In view of the aforementioned problem, an object of the present disclosure is to provide a location estimation system and a location estimation method capable of increasing the update frequency of location information.

A first exemplary aspect is a location estimation system, including: a feature value extraction processing unit configured to perform feature value extraction processing for extracting a feature value from an input image; and a location estimation processing unit configured to compare the extracted feature value with map information and perform location estimation processing for estimating a self-location based on a result of the comparison. While the location estimation processing unit is performing the location estimation processing corresponding to an input image that is input at a predetermined timing, the feature value extraction processing unit performs the feature value extraction processing on an input image that is input at a timing after the predetermined timing.

In the present disclosure, while the location estimation processing unit is performing the location estimation processing corresponding to an input image that is input at a predetermined timing, the feature value extraction processing unit performs the feature value extraction processing on an input image that is input at a timing after a predetermined timing. In other words, the feature value extraction processing unit performs the feature value extraction processing on the next input image in parallel with the location estimation processing performed by the location estimation processing unit. Thus, it is possible to increase the frequency of the feature value extraction processing on an input image, whereby it is possible to increase the frequency of the location estimation processing performed by the location estimation processing unit. Therefore, it is possible to increase the update frequency of location information in the location estimation system.

In the location estimation system described above, the feature value extraction processing unit may be configured to be able to perform in a parallel manner the feature value extraction processing on each of the input images that are input at timings different from each other by using a plurality of threads. By using a plurality of threads in this way, it is possible to reduce the processing time of the feature value extraction processing unit, and accordingly it is possible to increase the update frequency of location information.

In the location estimation system described above, the feature value extraction processing unit may be configured to be able to change the number of the threads in accordance with a state of the location estimation processing performed by the location estimation processing unit. By this configuration, it is possible to flexibly change the number of threads in the feature value extraction processing unit.

In the location estimation system described above, when a unit processing time of the feature value extraction processing is longer than a unit processing time of the location estimation processing, the feature value extraction processing unit may perform the feature value extraction processing by using the plurality of the threads. By using a plurality of threads in this way, it is possible to reduce the processing time of the feature value extraction processing unit, and accordingly it is possible to increase the update frequency of location information.

In the location estimation system described above, the feature value extraction processing unit may be configured to be able to change the number of the threads in accordance with the number of the input images to be input. By this configuration, it is possible to flexibly change the number of threads in the feature value extraction processing unit.

In the location estimation system described above, the location estimation processing unit may be configured to perform the location estimation processing by using a latest processing result among processing results of the feature value extraction processing. By performing the location estimation processing on the latest processing result in this way, it is possible to output location information corresponding to the latest input image. Thus, it is possible to improve a real-time characteristic of location information.

In the location estimation system described above, the location estimation processing unit may be configured to wait for a predetermined period of time until a timing at which the latest processing result of the feature value extraction processing is generated and perform the location estimation processing by using the latest processing result obtained after waiting the predetermined period of time. By using the latest processing result obtained after the location estimation processing unit 13 waits for a predetermined period of time in this way, it is possible to output location information corresponding to a newer input image. Thus, it is possible to improve a real-time characteristic of location information.

In the location estimation system described above, the input images may be images acquired and accumulated in advance, or images acquired in real time by using imaging means.

In the location estimation system described above, the feature value extraction processing unit may be provided in a local apparatus, and the location estimation processing unit may be provided in a server. By providing the feature value extraction processing unit and the location estimation processing unit in a distributed manner as described above, it is possible to reduce concentration of the processing load on one apparatus.

Another exemplary aspect is a location estimation method, including: a feature value extraction step of performing feature value extraction processing for extracting a feature value from an input image; and a location estimation step of comparing the extracted feature value with map information and performing location estimation processing for estimating a self-location based on a result of the comparison. In the feature value extraction step, while the location estimation processing corresponding to an input image that is input at a predetermined timing is being performed in the location estimation step, the feature value extraction processing is performed on an input image that is input at a timing after the predetermined timing.

In the present disclosure, in the feature value extraction step, while the location estimation processing corresponding to an input image that is input at a predetermined timing is being performed in the location estimation step, the feature value extraction processing is performed on an input image that is input at a timing after the predetermined timing. In other words, the feature value extraction processing and the location estimation processing are performed in parallel. Thus, it is possible to increase the frequency of the feature value extraction processing on an input image, and accordingly it is possible to increase the frequency of the location estimation processing in the location estimation step. Therefore, it is possible to increase the update frequency of location information.

According to the present disclosure, it is possible to provide a location estimation system and a location estimation method capable of increasing the update frequency of location information.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 2 is a table for explaining timings at which feature value extraction processing and location estimation processing are performed in the location estimation system according to the embodiment;

FIG. 3 is a table for explaining timings at which feature value extraction processing and location estimation processing are performed in a location estimation system according to related art;

DETAILED DESCRIPTION

Hereinafter, an embodiment will be described with reference to the drawings.

Figure 1:
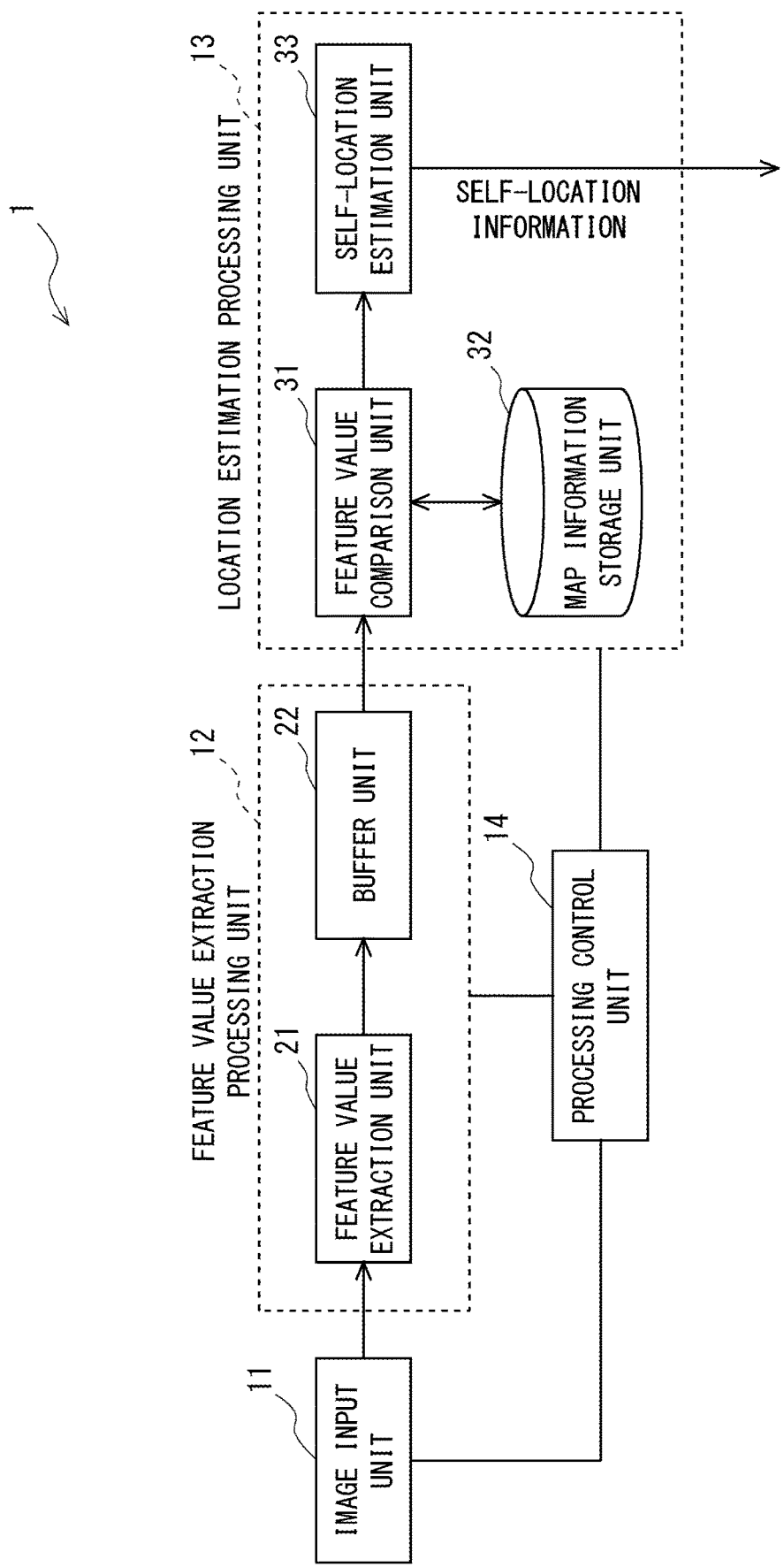
FIG. 1 is a block diagram for explaining a location estimation system according to an embodiment.

FIG. 1 is a block diagram for explaining a location estimation system according to the embodiment. As shown in FIG. 1, a location estimation system 1 according to this embodiment includes an image input unit 11, a feature value extraction processing unit 12, a location estimation processing unit 13, and a processing control unit 14. The feature value extraction processing unit 12 includes a feature value extraction unit 21 and a buffer unit 22. The location estimation processing unit 13 includes a feature value comparison unit 31, a map information storage unit 32, and a self-location estimation unit 33.

The image input unit 11 acquires an image (a video image) of an area surrounding the location estimation system over time. For example, the image input unit 11 is a camera (a digital camera or a video camera) including an imaging device. The camera may be a monocular camera or a stereo camera. In a case of a stereo camera, both left and right images are acquired. Further, in this embodiment, the image input unit 11 may acquire image data (video image data) shot in advance from the outside. That is, input images supplied from the image input unit 11 to the feature value extraction processing unit 12 are images acquired and accumulated in advance, or images acquired in real time using imaging means.

The feature value extraction processing unit 12 performs feature value extraction processing for extracting a feature value from the input image supplied from the image input unit 11. Specifically, the feature value extraction processing unit 12 includes the feature value extraction unit 21 and the buffer unit 22. The feature value extraction unit 21 receives an input image from the image input unit 11. Then the feature value extraction unit 21 performs the feature value extraction processing on the input image. For example, when the input image is a moving image shot at a predetermined frame rate, the feature value extraction processing unit 12 performs the feature value extraction processing on the image (the frame) at a predetermined timing. Therefore, the feature value extraction processing can also be referred to as frame processing.

The buffer unit 22 temporarily stores a processing result output from the feature value extraction unit 21, that is, information about the feature value extracted from the input image. Then the buffer unit 22 sequentially outputs the stored processing results of the feature value extraction unit 21 to the location estimation processing unit 13 at a predetermined timing (a timing instructed by the processing control unit 14).

It should be noted that the feature value extraction processing is processing for extracting a feature value included in an input image, and is processing for extracting a feature value from the input image by using, for example, a predetermined filter model. For example, Scale Invariant Feature Transform (SIFT) or Oriented FAST and Rotated BRIEF (ORB) can be used as the filter model. Note that in this embodiment, the feature value extraction processing is not limited to the above processing, and any processing for extracting a feature value from an input image may be used.

The location estimation processing unit 13 compares the feature value extracted by the feature value extraction processing unit 12 with map information and performs location estimation processing for estimating a self-location based on a result of the comparison. Specifically, the location estimation processing unit 13 includes the feature value comparison unit 31, the map information storage unit 32, and the self-location estimation unit 33. The map information storage unit 32 stores in advance map information of the area around a place where the location estimation system 1 is used. The feature value comparison unit 31 compares the feature value extracted by the feature value extraction processing unit 12 with the map information stored in the map information storage unit 32. The processing result (the result of the above comparison) of the feature value comparison unit 31 is output to the self-location estimation unit 33. The self-location estimation unit 33 estimates a self-location based on the result of the comparison supplied from the feature value comparison unit 31.

That is, the self-location estimation unit 33 estimates the coordinates of the self-location in the map information based on the result of the comparison supplied from the feature value comparison unit 31. For example, a point at which the feature value extracted from the input image coincides with the feature value in the map information is specified, and the coordinates of the specified point in the map information are obtained. By using the coordinates of a plurality of points specified in this manner, it is possible to estimate the coordinates of the self-location. Note that in this embodiment, the location estimation processing is not limited to the above processing, and any processing in which a self-location can be estimated from the extracted feature value may be used. Further, since the location estimation processing is processing for tracking a self-location which continuously changes, it can also be referred to as track processing.

The processing control unit 14 controls each processing for estimating a self-location in the location estimation system according to this embodiment. Specifically, the processing control unit 14 controls a timing at which the image input unit 11 supplies an input image to the feature value extraction processing unit 12. Further, the processing control unit 14 controls a timing at which the feature value extraction processing is performed by the feature value extraction processing unit 12. Further, the processing control unit 14 controls a timing at which the location estimation processing is performed by the location estimation processing unit 13. For example, the processing control unit 14 can control the timing at which the location estimation processing is performed by the location estimation processing unit 13 by controlling a timing at which the processing result of the feature value extraction processing stored in the buffer unit 22 is output to the location estimation processing unit 13 (the feature value comparison unit 31).

Next, an operation of the location estimation system according to this embodiment will be described. Note that the operation of the location estimation system described below can be implemented by the processing control unit 14 controlling the image input unit 11, the feature value extraction processing unit 12, and the location estimation processing unit 13.

FIG. 2 is a table for explaining timings at which feature value extraction processing and location estimation processing are performed in the location estimation system according to this embodiment. In the example shown in FIG. 2, input images P(t1) to P(t6) are supplied to the feature value extraction processing unit 12 at respective timings t1 to t6.

At the timing t1, the feature value extraction processing unit 12 performs feature value extraction processing F(t1) on the input image P(t1). After that, at the timing t2, the location estimation processing unit 13 performs location estimation processing L(t1) on a processing result of the feature value extraction processing F(t1). By doing so, self-location information S(t1) is generated at the timing t2. Note that in each of F(t1), L(t1), and S(t1), t1 in the parenthesis indicates a processing result for the input image at the timing t1. The same applies to the timing t2 and the subsequent timings.

Further, in this embodiment, while the location estimation processing unit 13 is performing the location estimation processing L(t1) at the timing t2, the feature value extraction processing unit 12 performs feature value extraction processing F(t2) on the next input image P(t2).

After that, at the timing t3, the location estimation processing unit 13 performs location estimation processing L(t2) on a processing result of the feature value extraction processing F(t2). By doing so, self-location information S(t2) is generated at the timing t3. In this case, as in the above case, while the location estimation processing unit 13 is performing the location estimation processing L(t2) at the timing t3, the feature value extraction processing unit 12 performs feature value extraction processing F(t3) on the next input image P(t3).

After that, by repeating operations similar to the above operations, the self-location information S corresponding to the input image P is sequentially generated.

As described above, in the location estimation system according to this embodiment, while the location estimation processing unit 13 is performing location estimation processing corresponding to an input image that is input at a predetermined timing, the feature value extraction processing unit 12 performs feature value extraction processing on an input image that is input at a timing after the predetermined timing. In other words, the feature value extraction processing unit 12 performs the feature value extraction processing on the next input image in parallel with the location estimation processing performed by the location estimation processing unit 13. Thus, it is possible to increase the frequency of the feature value extraction processing F on the input image P, whereby it is possible to increase the frequency of the location estimation processing L performed by the location estimation processing unit 13. Therefore, it is possible to increase the update frequency of location information of the location estimation system 1.

FIG. 3 is a table for explaining timings at which feature value extraction processing and location estimation processing are performed in a location estimation system according to related art. In the related art shown in FIG. 3, as in the case of this embodiment, the input images P(t1) to P(t6) are generated at the respective timings t1 to t6.

In the related art, at the timing t1, the feature value extraction processing F(t1) is performed on the input image P(t1). After that, at the timing t2, the location estimation processing L(t1) is performed on a processing result of the feature value extraction processing F(t1). By doing so, self-location information S(t1) is generated at the timing t2.

However, in the related art, while the location estimation processing L(t1) is being performed at the timing t2, the feature value extraction processing F(t3) is performed on the input image P(t3) at the timing t3 instead of performing the feature value extraction processing on the next input image P(t2). Then, at the timing t4, location estimation processing L(t3) is performed on a processing result of the feature value extraction processing F(t3), to thereby generate self-location information S(t3). Therefore, a timing at which self-location information can be acquired next to the timing t2 is the timing t4 (i.e., self-location information cannot be acquired at the timing t3).

As described above, in the related art, since the feature value extraction processing and the location estimation processing are alternately performed, the frequency of the self-location information S to be output is reduced.

On the contrary, in this embodiment, the feature value extraction processing unit 12 performs the feature value extraction processing on the next input image in parallel with the location estimation processing performed by the location estimation processing unit 13. Thus, it is possible to increase the frequency of the feature value extraction processing F on the input image P, whereby it is possible to increase the frequency of the location estimation processing L performed by the location estimation processing unit 13. Therefore, it is possible to increase the update frequency of location information of the location estimation system 1.

Figure 4:
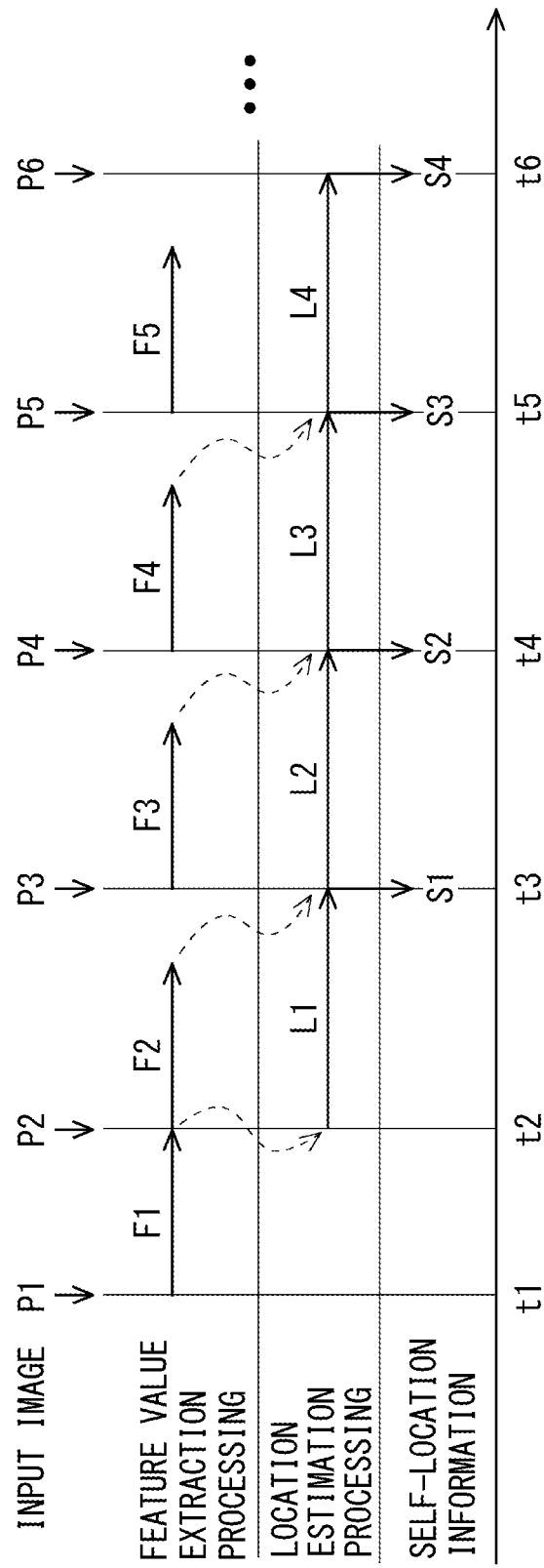
FIG. 4 is a timing chart for explaining the timings at which the feature value extraction processing and the location estimation processing are performed in the location estimation system according to the embodiment.

Next, another processing example of the location estimation system according to this embodiment will be described. FIG. 4 is a timing chart for explaining timings at which the feature value extraction processing and the location estimation processing are performed in the location estimation system according to this embodiment. In FIG. 4, each of a unit processing time of the feature value extraction processing and a unit processing time of the location estimation processing is indicated by the length of an arrow (the same applies to the subsequent timing charts). FIG. 4 shows a processing example in which a unit processing time ($t_F$) of the feature value extraction processing is shorter than a unit processing time ($t_L$) of the location estimation processing ($t_F < t_L$).

As shown in FIG. 4, when an input image P1 is supplied to the feature value extraction processing unit 12 at the timing t1, the feature value extraction processing unit 12 performs feature value extraction processing F1 on the input image P1. At the timing t2 after the completion of the feature value extraction processing F1, the location estimation processing unit 13 performs location estimation processing L1 on a processing result of the feature value extraction processing F1. By doing so, self-location information S1 is generated at the timing t3.

Further, when an input image P2 is supplied to the feature value extraction processing unit 12 at the timing t2, the feature value extraction processing unit 12 performs feature value extraction processing F2 on the input image P2. At this time, the feature value extraction processing F2 is performed in parallel with the location estimation processing L1.

At the timing t3 after the completion of the location estimation processing L1, the location estimation processing unit 13 performs location estimation processing L2 on a processing result of the feature value extraction processing F2. By doing so, self-location information S2 is generated at the timing t4. At this time, the processing result of the feature value extraction processing F2 is temporarily stored in the buffer unit 22. Then, at the timing t3 at which the location estimation processing unit 13 starts the location estimation processing L2, the buffer unit 22 supplies the processing result of the feature value extraction processing F2 to the location estimation processing unit 13. The subsequent processing is similar to the above processing.

Further, when an input image P3 is supplied to the feature value extraction processing unit 12 at the timing t3, the feature value extraction processing unit 12 performs feature value extraction processing F3 on the input image P3. At this time, the feature value extraction processing F3 is performed in parallel with the location estimation processing L2.

After that, by repeating operations similar to the above operations, the self-location information S corresponding to the input image P is sequentially generated.

In the case shown in FIG. 4, as in the above case, the feature value extraction processing unit 12 performs the feature value extraction processing on the next input image in parallel with the location estimation processing performed by the location estimation processing unit 13. Thus, it is possible to increase the frequency of the feature value extraction processing F on the input image P, whereby it is possible to increase the frequency of the location estimation processing L performed by the location estimation processing unit 13. Therefore, it is possible to increase the update frequency of location information of the location estimation system 1.

Figure 5:
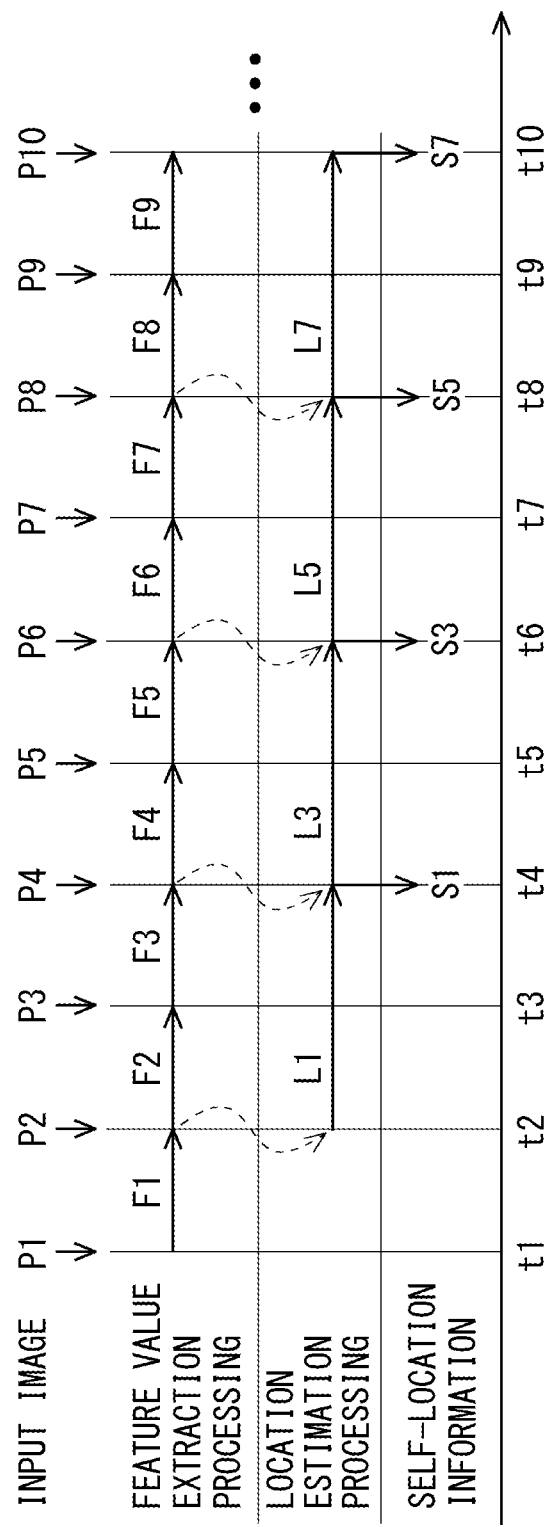
FIG. 5 is a timing chart for explaining the timings at which the feature value extraction processing and the location estimation processing are performed in the location estimation system according to the embodiment.

Another processing example of the location estimation system according to this embodiment will be further described with reference to FIG. 5. FIG. 5 shows a processing example in which the unit processing time ($t_L$) of the location estimation processing is twice as long as the unit processing time ($t_F$) of the feature value extraction processing ($t_L = t_F \times 2$).

As shown in FIG. 5, when the input image P1 is supplied to the feature value extraction processing unit 12 at the timing t1, the feature value extraction processing unit 12 performs the feature value extraction processing F1 on the input image P1. At the timing t2 after the completion of the feature value extraction processing F1, the location estimation processing unit 13 performs the location estimation processing L1 on a processing result of the feature value extraction processing F1. Further, when the input image P2 is supplied to the feature value extraction processing unit 12 at the timing t2, the feature value extraction processing unit 12 performs the feature value extraction processing F2 on the input image P2. At this time, the feature value extraction processing F2 is performed in parallel with the location estimation processing L1. After that, when the input image P3 is supplied to the feature value extraction processing unit 12 at the timing t3, the feature value extraction processing unit 12 performs the feature value extraction processing F3 on the input image P3. At this time, the feature value extraction processing F3 is performed in parallel with the location estimation processing L1. Note that the processing results of the feature value extraction processing F2 and F3 are temporarily stored in the buffer unit 22.

After that, when the location estimation processing L1 is completed at the timing t4, the location estimation processing unit 13 outputs the self-location information S1. Further, the location estimation processing unit 13 performs location estimation processing L3 on the processing result of the feature value extraction processing F3 which is the latest processing result among the processing results of the feature value extraction processing F2 and F3 stored in the buffer unit 22. Note that the processing result of the feature value extraction processing F2 is not used, and so it is discarded.

Further, when an input image P4 is supplied to the feature value extraction processing unit 12 at the timing t4, the feature value extraction processing unit 12 performs feature value extraction processing F4 on the input image P4. At this time, the feature value extraction processing F4 is performed in parallel with the location estimation processing L3. After that, when an input image P5 is supplied to the feature value extraction processing unit 12 at the timing t5, the feature value extraction processing unit 12 performs feature value extraction processing F5 on the input image P5. At this time, the feature value extraction processing F5 is performed in parallel with the location estimation processing L3. The processing results of the feature value extraction processing F4 and F5 are temporarily stored in the buffer unit 22.

After that, when the location estimation processing L3 is completed at the timing t6, the location estimation processing unit 13 outputs self-location information S3. Further, the location estimation processing unit 13 performs location estimation processing L5 on the processing result of the feature value extraction processing F5 which is the latest processing result among the processing results of the feature value extraction processing F4 and F5 stored in the buffer unit 22. Note that the processing result of the feature value extraction processing F4 is not used, and so it is discarded.

Further, when an input image P6 is supplied to the feature value extraction processing unit 12 at the timing t6, the feature value extraction processing unit 12 performs feature value extraction processing F6 on the input image P6. At this time, the feature value extraction processing F6 is performed in parallel with the location estimation processing L5.

After that, by repeating the operations similar to the above operations, the self-location information S corresponding to the input image P is sequentially generated.

In the processing example shown in FIG. 5, the unit processing time ($t_L$) of the location estimation processing is twice as long as the unit processing time ($t_F$) of the feature value extraction processing ($t_L = t_F \times 2$). In this case, since the feature value extraction processing proceeds faster than the location estimation processing, the location estimation processing unit 13 performs the location estimation processing on the latest processing result among the processing results of the feature value extraction processing stored in the buffer unit 22. By doing so, it is possible to generate self-location information corresponding to the latest input image.

Note that when the unit processing time ($t_L$) of the location estimation processing and the unit processing time ($t_F$) of the feature value extraction processing satisfy the condition "$t_L > t_F \times 2$", it is possible, as in the above case, to generate self-location information corresponding to the latest input image by performing location estimation processing using the latest processing result among the processing results of the feature value extraction processing stored in the buffer unit 22.

Next, a case in which the feature value extraction processing unit 12 performs feature value extraction processing using a plurality of threads will be described with reference to FIGS. 6 to 9.

Figure 6:
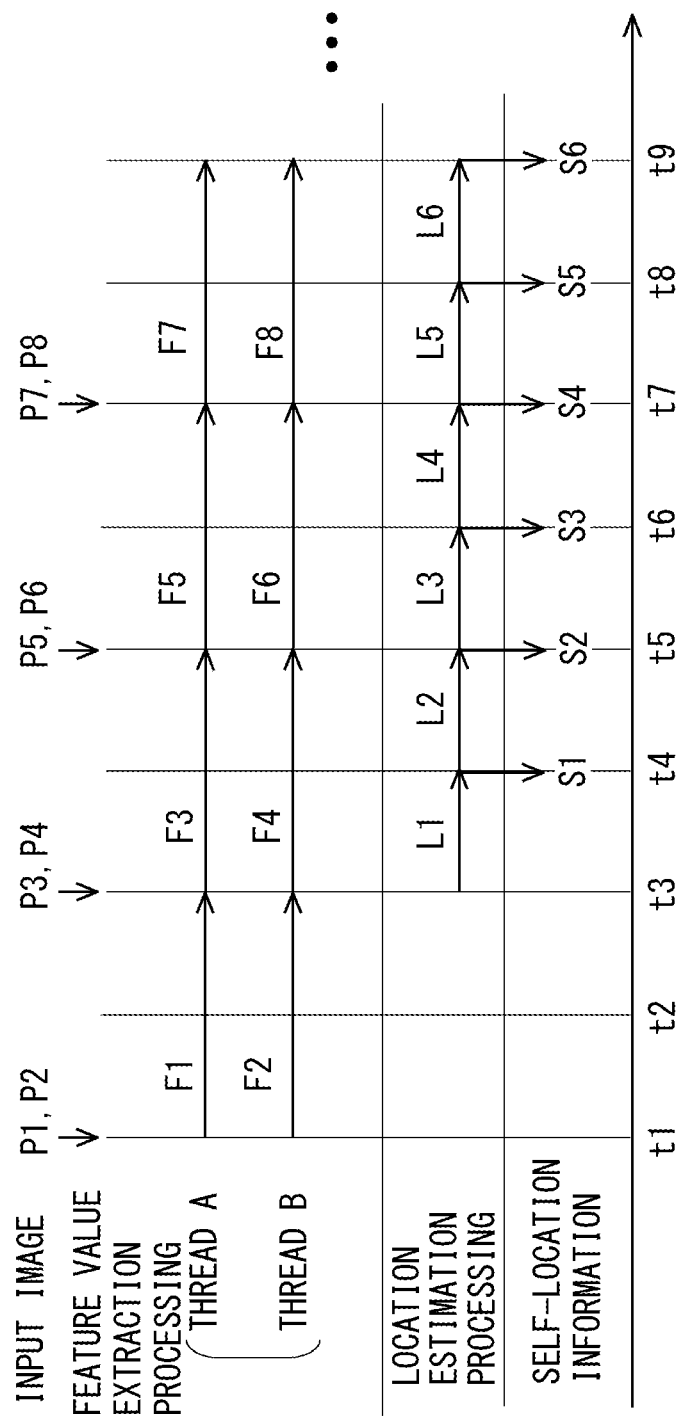
FIG. 6 is a timing chart for explaining the timings at which the feature value extraction processing and the location estimation processing are performed in the location estimation system according to the embodiment.

FIG. 6 shows an example in which the feature value extraction processing unit 12 performs the feature value extraction processing using two threads A and B. Further, FIG. 6 shows an example in which the image input unit 11 performs self-location estimation on image data (video image data) shot in advance (offline processing). Further, in FIG. 6, the unit processing time ($t_F$) of the feature value extraction processing is twice as long as the unit processing time ($t_L$) of the location estimation processing ($t_F = t_L \times 2$).

As shown in FIG. 6, when the input images P1 and P2 are supplied to the feature value extraction processing unit 12 at the timing t1, the feature value extraction processing unit 12 performs the feature value extraction processing F1 and F2 on the input images P1 and P2, respectively. Specifically, the feature value extraction processing unit 12 performs the feature value extraction processing F1 on the input image P1 in the thread A while it performs the feature value extraction processing F2 on the input image P2 in the thread B.

At the timing t3 after the completion of the feature value extraction processing F1 and the feature value extraction processing F2, the location estimation processing unit 13 performs the location estimation processing L1 on a processing result of the feature value extraction processing F1. At this time, the processing result of the feature value extraction processing F2 is temporarily stored in the buffer unit 22.

Further, when the input images P3 and P4 are supplied to the feature value extraction processing unit 12 at the timing t3, the feature value extraction processing unit 12 performs the feature value extraction processing F3 and F4 on the input images P3 and P4, respectively. Specifically, the feature value extraction processing unit 12 performs the feature value extraction processing F3 on the input image P3 in the thread A while it performs the feature value extraction processing F4 on the input image P4 in the thread B. At this time, the feature value extraction processing F3 and the feature value extraction processing F4 are performed in parallel with the location estimation processing L1 and the location estimation processing L2.

After that, when the location estimation processing L1 is completed at the timing t4, the location estimation processing unit 13 outputs the self-location information S1. Further, the location estimation processing unit 13 performs the location estimation processing L2 on the processing result of the feature value extraction processing F2 stored in the buffer unit 22.

After that, when the location estimation processing L2 is completed at the timing t5, the location estimation processing unit 13 outputs the self-location information S2. Further, the location estimation processing unit 13 performs the location estimation processing L3 on a processing result of the feature value extraction processing F3.

Further, when the input images P5 and P6 are supplied to the feature value extraction processing unit 12 at the timing t5, the feature value extraction processing unit 12 performs the feature value extraction processing F5 and F6 on the input images P5 and P6, respectively. Specifically, the feature value extraction processing unit 12 performs the feature value extraction processing F5 on the input image P5 in the thread A while it performs the feature value extraction processing F6 on the input image P6 in the thread B. At this time, the feature value extraction processing F5 and the feature value extraction processing F6 are performed in parallel with the location estimation processing L3 and the location estimation processing L4.

After that, by repeating the operations similar to the above operations, the self-location information S corresponding to the input image P is sequentially generated.

In the processing example shown in FIG. 6, the unit processing time ($t_F$) of the feature value extraction processing is longer than the unit processing time ($t_L$) of the location estimation processing. Therefore, by the feature value extraction processing unit 12 performing the feature value extraction processing using the two threads A and B, it is possible to reduce the processing time of the feature value extraction processing unit 12, and accordingly it is possible to increase the update frequency of location information.

Further, in the processing example shown in FIG. 6, as in the above case, the feature value extraction processing unit 12 performs the feature value extraction processing in parallel with the location estimation processing performed by the location estimation processing unit 13. Thus, it is possible to increase the frequency of the feature value extraction processing F on the input image P, whereby it is possible to increase the frequency of the location estimation processing L performed by the location estimation processing unit 13. Therefore, it is possible to increase the update frequency of location information of the location estimation system 1.

Figure 7:
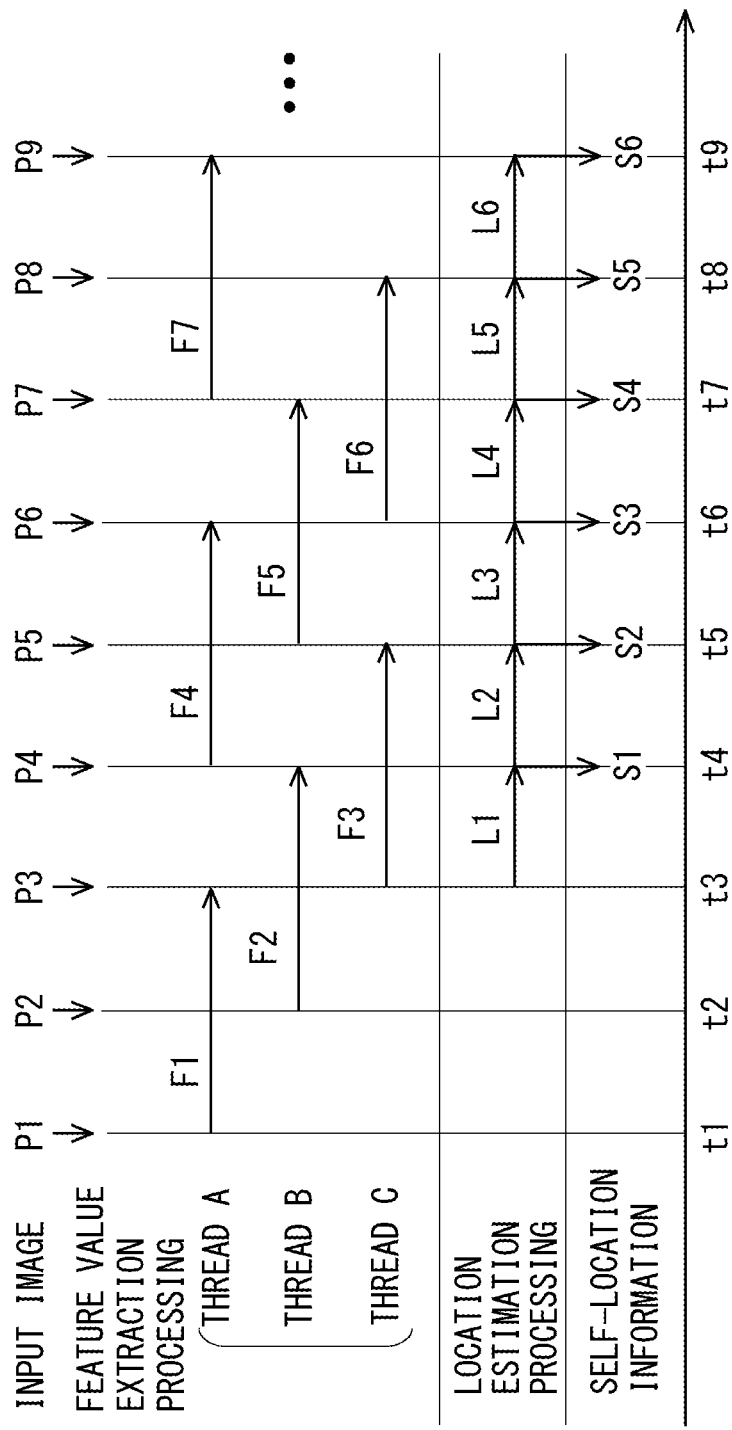
FIG. 7 is a timing chart for explaining the timings at which the feature value extraction processing and the location estimation processing are performed in the location estimation system according to the embodiment.

Next, a processing example shown in FIG. 7 will be described. FIG. 7 shows an example in which the feature value extraction processing unit 12 performs the feature value extraction processing using three threads A, B, and C. Further, FIG. 7 shows an example in which the image input unit 11 acquires image data (video image data) in real time and performs self-location estimation on the acquired image data (online processing). Further, in FIG. 7, the unit processing time ($t_F$) of the feature value extraction processing is twice as long as the unit processing time ($t_L$) of the location estimation processing ($t_F = t_L \times 2$).

As shown in FIG. 7, when the input image P1 is supplied to the feature value extraction processing unit 12 at the timing t1, the thread A of the feature value extraction processing unit 12 performs the feature value extraction processing F1 on the input image P1. After that, when the input image P2 is supplied to the feature value extraction processing unit 12 at the timing t2, the thread B of the feature value extraction processing unit 12 performs the feature value extraction processing F2 on the input image P2.

Further, since the feature value extraction processing F1 is completed at the timing t3, the location estimation processing unit 13 performs the location estimation processing L1 on the processing result of the feature value extraction processing F1. Further, when the input image P3 is supplied to the feature value extraction processing unit 12 at the timing t3, the thread C of the feature value extraction processing unit 12 performs the feature value extraction processing F3 on the input image P3. At this time, the feature value extraction processing F3 is performed in parallel with the location estimation processing L1 and the location estimation processing L2.

After that, when the location estimation processing L1 is completed at the timing t4, the location estimation processing unit 13 outputs the self-location information S1. Further, since the feature value extraction processing F2 is completed at the timing t4, the location estimation processing unit 13 performs the location estimation processing L2 on the processing result of the feature value extraction processing F2.

Further, when the input image P4 is supplied to the feature value extraction processing unit 12 at the timing t4, the thread A of the feature value extraction processing unit 12 performs the feature value extraction processing F4 on the input image P4. At this time, the feature value extraction processing F4 is performed in parallel with the location estimation processing L2 and the location estimation processing L3.

After that, when the location estimation processing L2 is completed at the timing t5, the location estimation processing unit 13 outputs the self-location information S2. Further, since the feature value extraction processing F3 is completed at the timing t5, the location estimation processing unit 13 performs the location estimation processing L3 on the processing result of the feature value extraction processing F3.

Further, when the input image P5 is supplied to the feature value extraction processing unit 12 at the timing t5, the thread B of the feature value extraction processing unit 12 performs the feature value extraction processing F5 on the input image P5. At this time, the feature value extraction processing F5 is performed in parallel with the location estimation processing L3 and the location estimation processing L4.

After that, by repeating the operations similar to the above operations, the self-location information S corresponding to the input image P is sequentially generated.

In the processing example shown in FIG. 7, the unit processing time ($t_F$) of the feature value extraction processing is longer than the unit processing time ($t_L$) of the location estimation processing. Therefore, by the feature value extraction processing unit 12 performing the feature value extraction processing using the three threads A, B, and C, it is possible to reduce the processing time of the feature value extraction processing unit 12, and accordingly it is possible to increase the update frequency of location information.

Further, in the processing example shown in FIG. 7, as in the above case, the feature value extraction processing unit 12 performs the feature value extraction processing in parallel with the location estimation processing performed by the location estimation processing unit 13. Thus, it is possible to increase the frequency of the feature value extraction processing F on the input image P, whereby it is possible to increase the frequency of the location estimation processing L performed by the location estimation processing unit 13. Therefore, it is possible to increase the update frequency of location information of the location estimation system 1.

Figure 8:
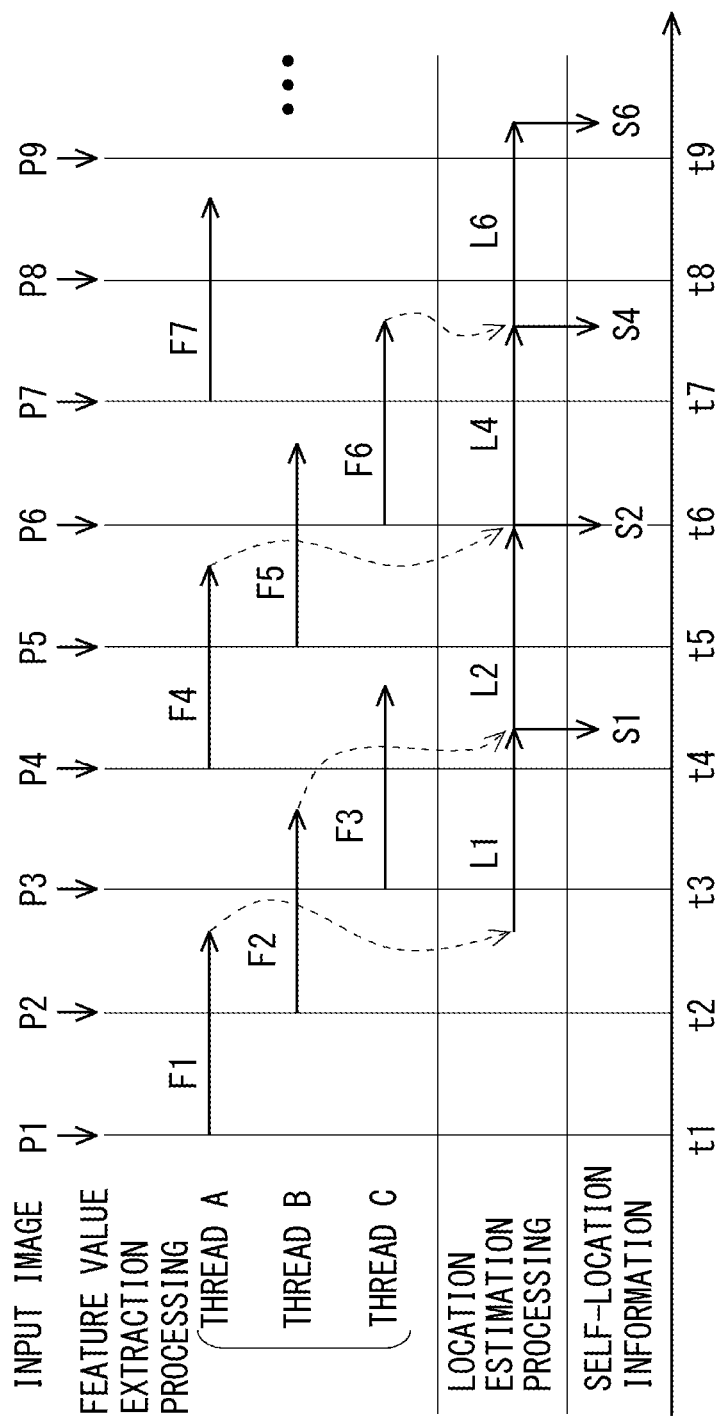
FIG. 8 is a timing chart for explaining the timings at which the feature value extraction processing and the location estimation processing are performed in the location estimation system according to the embodiment.

Next, a processing example shown in FIG. 8 will be described. FIG. 8 shows an example in which the feature value extraction processing unit 12 performs the feature value extraction processing using the three threads A, B, and C. Further, FIG. 8 shows an example in which the image input unit 11 acquires image data (video image data) in real time and performs self-location estimation on the acquired image data (online processing). Further, in the example shown in FIG. 8, the length of the unit processing time ($t_F$) of the feature value extraction processing is substantially the same as that of the unit processing time ($t_L$) of the location estimation processing.

As shown in FIG. 8, when the input image P1 is supplied to the feature value extraction processing unit 12 at the timing t1, the thread A of the feature value extraction processing unit 12 performs the feature value extraction processing F1 on the input image P1. Further, when the input image P2 is supplied to the feature value extraction processing unit 12 at the timing t2, the thread B of the feature value extraction processing unit 12 performs the feature value extraction processing F2 on the input image P2. Further, when the input image P3 is supplied to the feature value extraction processing unit 12 at the timing t3, the thread C of the feature value extraction processing unit 12 performs the feature value extraction processing F3 on the input image P3. The processing results of the feature value extraction processing F1 to F3 performed by the respective threads A to C are temporarily stored in the buffer unit 22. Further, at the timing t4 and later, in a manner similar to that described above, the threads A to C of the feature value extraction processing unit 12 perform the feature value extraction processing F4 to F6 on the input images P4 to P6, respectively, when the input images P4 to P6 are supplied to the feature value extraction processing unit 12.

When the feature value extraction processing F1 is completed in the thread A of the feature value extraction processing unit 12, the location estimation processing unit 13 starts the location estimation processing L1 on the processing result of the feature value extraction processing F1. Then, when the location estimation processing L1 is completed, the location estimation processing unit 13 outputs the self-location information S1. Next, the location estimation processing unit 13 starts the location estimation processing L2 on a latest processing result F2 among the processing results of the feature value extraction processing stored in the buffer unit 22.

Then, when the location estimation processing L2 is completed, the location estimation processing unit 13 outputs the self-location information S2. Next, the location estimation processing unit 13 starts location estimation processing L4 on a latest processing result F4 among the processing results of the feature value extraction processing stored in the buffer unit 22. That is, at the timing t6, the buffer unit 22 stores the processing results F3 and F4 as processing results of the feature value extraction processing. Here, since the processing result F4 is the latest processing result, the location estimation processing unit 13 starts the location estimation processing L4 on the latest processing result F4.

After that, by repeating the operations similar to the above operations, the self-location information S corresponding to the input image P is sequentially generated.

In the processing example shown in FIG. 8, the feature value extraction processing unit 12 performs the feature value extraction processing using the three threads A, B, and C, so that it is possible to reduce the processing time of the feature value extraction processing unit 12. Thus, it is possible to increase the update frequency of location information. Further, the location estimation processing unit 13 performs the location estimation processing on the latest processing result among the processing results of the feature value extraction processing stored in the buffer unit 22. Therefore, it is possible to output self-location information corresponding to the latest input image, whereby it is possible to improve the real-time characteristic of the self-location information.

Figure 9:
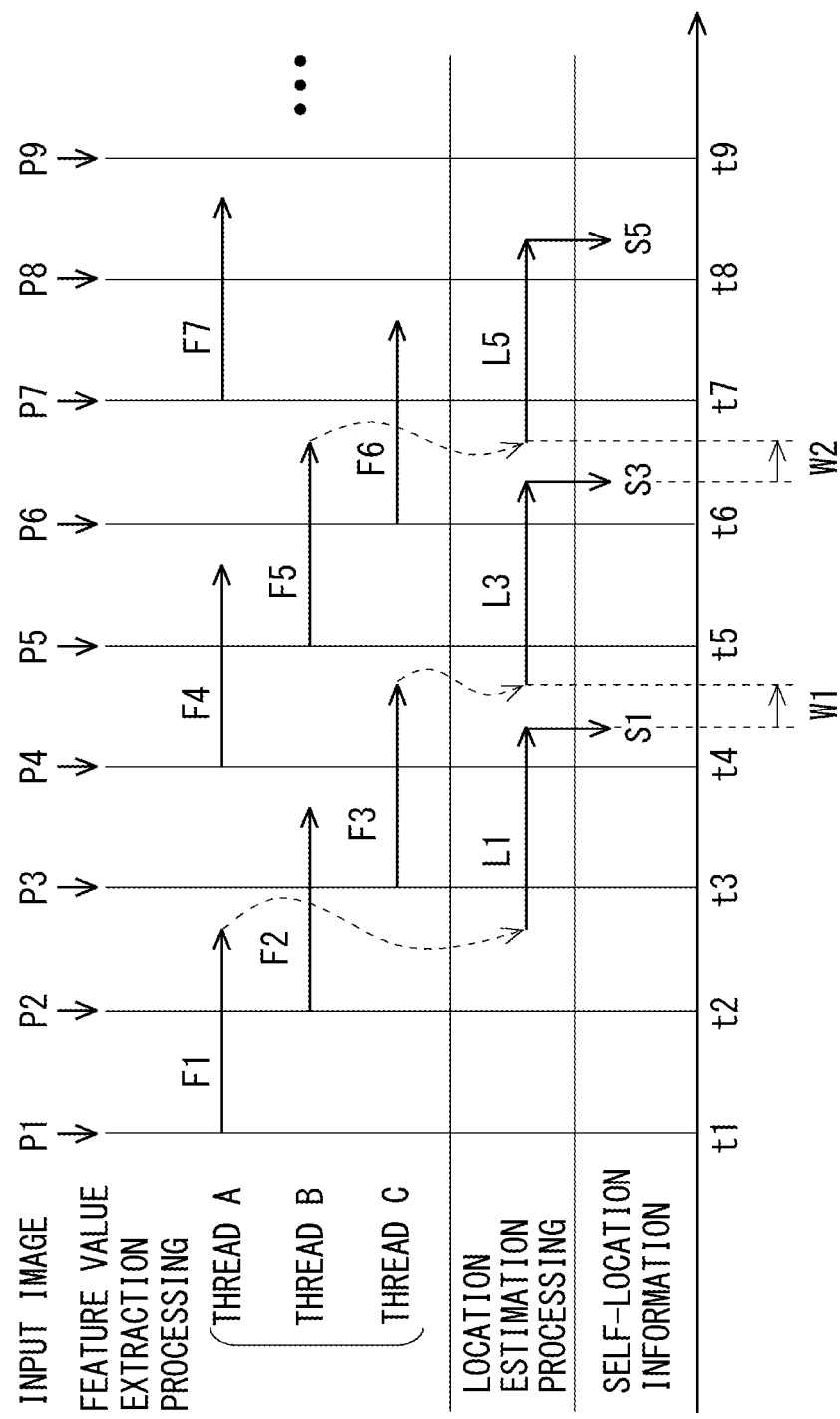
FIG. 9 is a timing chart for explaining the timings at which the feature value extraction processing and the location estimation processing are performed in the location estimation system according to the embodiment.

Next, a processing example shown in FIG. 9 will be described. FIG. 9 shows an example in which the feature value extraction processing unit 12 performs the feature value extraction processing using the three threads A, B, and C. Further, FIG. 9 shows an example in which the image input unit 11 acquires image data (video image data) in real time and performs self-location estimation on the acquired image data (online processing). Further, in the example shown in FIG. 9, the length of the unit processing time ($t_F$) of the feature value extraction processing is substantially the same as that of the unit processing time ($t_L$) of the location estimation processing.

As shown in FIG. 9, when the input image P1 is supplied to the feature value extraction processing unit 12 at the timing t1, the thread A of the feature value extraction processing unit 12 performs the feature value extraction processing F1 on the input image P1. Further, when the input image P2 is supplied to the feature value extraction processing unit 12 at the timing t2, the thread B of the feature value extraction processing unit 12 performs the feature value extraction processing F2 on the input image P2. Further, when the input image P3 is supplied to the feature value extraction processing unit 12 at the timing t3, the thread C of the feature value extraction processing unit 12 performs the feature value extraction processing F3 on the input image P3. The processing results of the feature value extraction processing F1 to F3 performed by the respective threads A to C are temporarily stored in the buffer unit 22. Further, at the timing t4 and later, in a manner similar to that described above, the threads A to C of the feature value extraction processing unit 12 perform the feature value extraction processing F4 to F6 on the input images P4 to P6, respectively, when the input images P4 to P6 are supplied to the feature value extraction processing unit 12.

When the feature value extraction processing F1 is completed in the thread A of the feature value extraction processing unit 12, the location estimation processing unit 13 starts the location estimation processing L1 on the processing result of the feature value extraction processing F1. Then, when the location estimation processing L1 is completed, the location estimation processing unit 13 outputs the self-location information S1.

After that, the location estimation processing unit 13 starts the location estimation processing on the latest processing result of the feature value extraction processing. At this time, in the processing example shown in FIG. 9, the location estimation processing unit 13 waits for a predetermined period of time until a timing at which the latest processing result of the feature value extraction processing is generated and performs the location estimation processing by using the latest processing result obtained after waiting the predetermined period of time.

To be more specific, after the completion of the location estimation processing L1, the location estimation processing unit 13 does not start the location estimation processing on the processing result of the feature value extraction processing F2 which has already been obtained, but waits for a predetermined period of time W1 and performs the location estimation processing on the processing result of the feature value extraction processing F3 which is the latest processing result obtained after waiting the predetermined period of time W1. In other words, the location estimation processing unit 13 waits for the period of time W1 until the feature value extraction processing F3 is completed and then performs the location estimation processing on the latest processing result F3 of the feature value extraction processing.

After that, by repeating the operations similar to the above operations, the self-location information S corresponding to the input image P is sequentially generated.

In the processing example shown in FIG. 9, the feature value extraction processing unit 12 performs the feature value extraction processing using the three threads A, B, and C, so that it is possible to reduce the processing time of the feature value extraction processing unit 12. Thus, it is possible to increase the update frequency of location information. Further, the location estimation processing unit 13 waits for a predetermined period of time until the timing at which the latest processing result of the feature value extraction processing is generated and performs the location estimation processing by using the latest processing result obtained after waiting the predetermined period of time. Therefore, it is possible to output self-location information corresponding to a newer input image, whereby it is possible to improve the real-time characteristic of the self-location information.

While the processing examples of the location estimation system according to this embodiment have been described above, the present invention is not limited to the above processing examples. For example, in the location estimation system according to this embodiment, it is possible to freely determine the unit processing time ($t_F$) of the feature value extraction processing, the unit processing time ($t_L$) of the location estimation processing, the timing of the feature value extraction processing, the timing of the location estimation processing, the number of threads, and the like.

For example, in this embodiment, the processing control unit 14 may change the number of threads of the feature value extraction processing unit 12 in accordance with a state (e.g., a processing speed) of the location estimation processing performed by the location estimation processing unit 13 (feedback control). For example, when the processing speed of the location estimation processing is high and the supply of the processing result of the feature value extraction processing cannot keep up with it, the processing control unit 14 increases the number of threads of the feature value extraction processing unit 12, thereby increasing the processing speed of the feature value extraction processing. Meanwhile, when the supply of the processing result of the feature value extraction processing is too large, the processing control unit 14 may reduce the number of threads of the feature value extraction processing unit 12. By this configuration, it is possible to flexibly change the number of threads of the feature value extraction processing unit 12.

Further, in this embodiment, the processing control unit 14 may change the number of threads of the feature value extraction processing unit 12 in accordance with the number of input images to be input. For example, when the number of input images to be input is large, the processing control unit 14 increases the number of threads of the feature value extraction processing unit 12, thereby increasing the processing capacity of the feature value extraction processing. Meanwhile, when the processing speed of the feature value extraction processing is too high, the processing control unit 14 may reduce the number of threads of the feature value extraction processing unit 12. By this configuration, it is possible to flexibly change the number of threads of the feature value extraction processing unit 12.

Further, the feature value extraction processing unit 12 may change the number of threads in accordance with the number of feature values included in the input image. For example, since a processing load is large when the number of feature values included in an input image is large, the feature value extraction processing unit 12 increases the number of threads thereof, thereby increasing the processing capacity of the feature value extraction processing. Meanwhile, since a processing load is small when the number of feature values included in an input image is small, the feature value extraction processing unit 12 may reduce the number of threads thereof. By this configuration, it is possible to flexibly change the number of threads of the feature value extraction processing unit 12.

Further, for example, the location estimation system according to this embodiment shown in FIG. 1 is composed of hardware mainly using a computer including a Central Processing Unit (CPU) that performs arithmetic processing and the like, a memory including Read Only Memory (ROM) and Random Access Memory (RAM), which stores an arithmetic programs and the like executed by the CPU, and an interface unit (I/F) that receives and outputs signals from and to the outside. The CPU, the memory, and the interface unit are connected to one another through a data bus or the like.

Further, the location estimation method according to this embodiment can be performed, for example, by executing a program in the above-described computer.

The location estimation method according to this embodiment includes:

(1) a feature value extraction step of performing feature value extraction processing for extracting a feature value from an input image; and (2) a location estimation step of comparing the extracted feature value with map information and performing location estimation processing for estimating a self-location based on a result of the comparison.

At this time, in the feature value extraction step, while the location estimation processing corresponding to an input image that is input at a predetermined timing is being performed in the location estimation step, the feature value extraction processing is performed on an input image that is input at a timing after the predetermined timing.

In the location estimation system according to this embodiment, the feature value extraction processing unit 12 and the location estimation processing unit 13 may be provided at places different from each other. For example, the feature value extraction processing unit 12 may be provided in a local apparatus, and the location estimation processing unit 13 may be provided in a server.

For example, when the location estimation system according to this embodiment is applied to a robot system, the feature value extraction processing unit 12 may be mounted on a robot, and the location estimation processing unit 13 may be provided in a management server of the robot. For example, the management server of the robot is a cloud server provided at a place remote from the robot. When such a configuration is employed, real-time image data is acquired by a camera of the robot, and the feature value extraction processing unit 12 of the robot performs feature value extraction processing on the acquired image data (input image). Then, the robot transmits a processing result of the feature value extraction processing to the management server. The location estimation processing unit 13 provided in the management server performs location estimation processing on the transmitted processing result of the feature value extraction processing. Then, the management server transmits a result of the location estimation processing to the robot. This configuration enables a robot to recognize a self-location in real time. Further, since the feature value extraction processing unit 12 and the location estimation processing unit 13 are provided in the robot and the management server in a distributed manner, it is possible to reduce the processing load of the robot.

Further, the location estimation system according to this embodiment can be suitably used for VSLAM. That is, in the location estimation system according to this embodiment, estimation of a self-location and generation of map information (generation of an environmental map) may be performed simultaneously.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A location estimation system comprising:
a feature value extraction processing unit configured to perform feature value extraction processing for extracting a feature value from an input image; and
a location estimation processing unit configured to compare the extracted feature value with map information and perform location estimation processing for estimating a self-location based on a result of the comparison,
wherein while the location estimation processing unit is performing the location estimation processing corresponding to an input image that is input at a predetermined timing, the feature value extraction processing unit performs the feature value extraction processing on an input image that is input at a timing after the predetermined timing.

2. The location estimation system according to claim 1, wherein the feature value extraction processing unit is configured to be able to perform in a parallel manner the feature value extraction processing on each of the input images that are input at timings different from each other by using a plurality of threads.

3. The location estimation system according to claim 2, wherein the feature value extraction processing unit is configured to be able to change a number of the threads in accordance with a state of the location estimation processing performed by the location estimation processing unit.

4. The location estimation system according to claim 2, wherein when a unit processing time of the feature value extraction processing is longer than a unit processing time of the location estimation processing, the feature value extraction processing unit performs the feature value extraction processing by using the plurality of the threads.

5. The location estimation system according to claim 2, wherein the feature value extraction processing unit is configured to be able to change a number of the threads in accordance with a number of the input images to be input.

6. The location estimation system according to claim 2, wherein the location estimation processing unit is configured to perform the location estimation processing by using a latest processing result among processing results of the feature value extraction processing.

7. The location estimation system according to claim 2, wherein the location estimation processing unit is configured to wait for a predetermined period of time until a timing at which a latest processing result of the feature value extraction processing is generated and perform the location estimation processing by using the latest processing result obtained after waiting the predetermined period of time.

8. The location estimation system according to claim 1, wherein the input images are images acquired and accumulated in advance, or images acquired in real time by using imaging means.

9. The location estimation system according to claim 1, wherein
the feature value extraction processing unit is provided in a local apparatus, and
the location estimation processing unit is provided in a server.

10. A location estimation method comprising:
a feature value extraction step of performing feature value extraction processing for extracting a feature value from an input image; and
a location estimation step of comparing the extracted feature value with map information and performing location estimation processing for estimating a self-location based on a result of the comparison,
wherein in the feature value extraction step, while the location estimation processing corresponding to an input image that is input at a predetermined timing is being performed in the location estimation step, the feature value extraction processing is performed on an input image that is input at a timing after the predetermined timing.

* * * * *